United States Patent Office 2,830,870

Patented Apr. 15, 1958

1

2,830,870

METHOD OF CONTROLLING ODORS IN SODA AND NEUTRAL SULPHITE PULP MILLS

Jack McK. Limerick, Westmount, Quebec, Canada

No Drawing. Application December 8, 1954
Serial No. 474,020

1 Claim. (Cl. 21—55)

In my co-pending application Serial No. 474,019 filed of even date herewith, I have disclosed a method of eliminating offensive odors involved in the operation of kraft pulp mills. In such mills, the chief offenders are hydrogen sulphide, occurring primarily in the stack gases from the recovery furnaces and methyl mercaptan, vented as digester relief, evaporator relief, etc.

It is an object of the present invention to provide a method for the elimination of odors involved in the operation of straight soda pulp mills, semi-chemical pulp mills and neutral sulphite mills, excluding from the scope of this present invention any operation in which sodium sulphide forms any significant part of the cooking liquor.

Kraft mills, for the most part, operate on soft, coniferous woods, while the soda, semi-chemical and neutral sulphite mills for the most part, operate on harder, deciduous woods. These latter are marked by a higher content of trannin and hemicellulose than are the former. This face, coupled with the absence of sodium sulphide in the cooking liquor, is believed to account for the difference between the odors generated by the kraft mill and those generated by mills carrying out cooking operations in the absence of sodium sulphide. Kraft mill odors are outrightly obnoxious purely as a matter of olfactory response. In this respect, the odors with which this application are concerned, are far less obnoxious. They do, however, have a depressing or stifling effect, particularly noticeable by individuals suffering from any cardiac trouble or from asthma, sinus or other nasal or respiratory disorder.

Various efforts have been made to overcome the odor situation in all types of pulp mills. These have been mainly along the line of "odor counteraction." Certain pairs of odors in certain critical proportions, are mutually antagonistic and when thus admixed, the mixture is odorless. Such treatments of stack gases has proven effective on various installations but is subject to certain difficulties. These arise out of the fact that on the one hand, proportioning is critical and on the other hand, the makeup of the gases to be treated is variable, for which reason constant observation and adjustment is required. Such treatment, moreover, is relatively costly, running from twenty to thirty cents per ton of pulp produced. In pulp mill operations, there is a serious element of cost.

I have found that the injection of a small proportion of ozone into any stack or vent line, carrying what usually are undesirable odors, will effectively eliminate the stifling, depressing effect above mentioned. This treatment

2 is particularly advantageous in that ozone has relatively little odor of its own and what it has is not unpleasant. Moreover, in any concentration in which the mixture of ozone and discharge gases could reach the ground, the ozone could have no adverse health effect and, on the contrary, may prove beneficially stimulating. Since the proportioning is not critical, the rate of ozone addition may be set initially somewhat in excess of the minimum requirements, so that constant regulation becomes unnecessary and the operating cost is the cost of power for operating the ozone generator, plus the necessary fans, etc. No labor cost is involved.

The ozone preferably should be added subsequent to any scrubbing or condensing treatments to which the gases may be subjected and for best effects, at minimum ozone requirements, the ozone and the gas into which it is injected, should remain in contact at least two seconds before being discharged into the atmosphere. The ozone requirements of any particular stack or vent is an individual problem. It is doubtful, however, that much less than ten parts per million of ozone in the total stack gases would be effective on any stack. In view of the results attained thus far, it seems improbable that more than one hundred parts per million would be required to overcome even the worst conditions.

By way of specific example, a mill producing 150 tons of pulp per day from hard wood, using NaOH as the digestant, treated its effluent gases with ozone in the proportion of 25 parts per million with an average retention time calculated at 2.2 seconds, with completely satisfactory deodorization. Power requirements approximated 1800 kw.; operating cost even at the high rate of one cent per kw., would be less than 12½ cents per ton, while at the more usual rate of ½ a cent, the cost would barely exceed six cents per ton. Either figure is amply justified by improved employee and public relations.

It is to be emphasized that ozone does not act as a conventional "masking" agent. In odor masking, a stronger, but preferable odor is used to overcome an objectionable odor, e. g.: perfume vs. perspiration. Ozone itself has a low odor value. Oddly enough, the ozone, though considered highly oxidative, deodorizes the gases without itself completely reacting. Indeed, the amount of ozone sufficient for deodorization is far less than that theoretically required for complete reaction with oxidizable components of the gas.

I claim:

In the operation of a pulp mill producing chemical pulp by means of a cooking liquor free of any significant proportion of sodium sulphide, the steps of mixing ozone with effluent gases in the proportion of about 10 to about 100 parts per million of the total volume of gases, maintaining said ozone and said gases in intimate mixture for not less than about 2 seconds and thereafter venting said mixture to the atmosphere.

References Cited in the file of this patent

UNITED STATES PATENTS 1,574,617 Gallagher ............. Feb. 23, 1926

OTHER REFERENCES

Summer: Manufacturing Chemist, March 1953, pp. 105–110.